United States Patent
Zhen et al.

(10) Patent No.: US 10,186,957 B2
(45) Date of Patent: Jan. 22, 2019

(54) SOFT-SWITCHING CONTROL CIRCUIT OF BOOST-TYPE PFC CONVERTER

(71) Applicant: Institute of Geology and Geophysics, the Chinese Academy of Sciences, Beijing (CN)

(72) Inventors: Qihui Zhen, Beijing (CN); Qingyun Di, Beijing (CN)

(73) Assignee: INSTITUTE OF GEOLOGY AND GEOPHYSICS, CAS, Beijing (CN)

( * ) Notice: Subject to any disclaimer, the term of this patent is extended or adjusted under 35 U.S.C. 154(b) by 0 days.

(21) Appl. No.: 15/993,630

(22) Filed: May 31, 2018

(65) Prior Publication Data

US 2018/0278153 A1   Sep. 27, 2018

Related U.S. Application Data

(63) Continuation of application No. PCT/CN2017/116941, filed on Dec. 18, 2017.

(30) Foreign Application Priority Data

Jan. 20, 2017   (CN) .......................... 2017 1 0048525
Jan. 20, 2017   (CN) .......................... 2017 1 0052071

(51) Int. Cl.
    H02M 1/42      (2007.01)
    H02M 7/219     (2006.01)
    H02M 1/00      (2006.01)

(52) U.S. Cl.
    CPC ........... *H02M 1/4241* (2013.01); *H02M 1/42* (2013.01); *H02M 1/4225* (2013.01);
    (Continued)

(58) Field of Classification Search
    CPC ........... H02M 2001/0058; H02M 1/42; H02M 1/4241; H02M 1/4225; H02M 1/4233;
    (Continued)

(56) References Cited

U.S. PATENT DOCUMENTS

4,864,483 A * 9/1989 Divan ................. H02M 5/4585
                                                    363/37
8,576,593 B2 * 11/2013 Mori .................... H02M 1/4216
                                                    363/125
(Continued)

FOREIGN PATENT DOCUMENTS

CN      1564447 A      1/2005
CN    203151389 U      8/2013

OTHER PUBLICATIONS

International Searching Authority (SIPO), Written comments by the International Search Authority (PCT/CN2017/116941), dated Mar. 14, 2018.

*Primary Examiner* — Emily P Pham
*Assistant Examiner* — Shahzeb K Ahmad
(74) *Attorney, Agent, or Firm* — Hemisphere Law, PLLC; Zhigang Ma

(57) ABSTRACT

A soft-switching control circuit of a boost-type PFC converter is provided. The boost-type PFC converter is a three-phase six-switch boost-type PFC converter, which includes six primary switching transistors and an auxiliary switching transistor. The control circuit includes a primary switch control circuit configured to output driving signals for the primary switching transistors by a one-cycle control algorithm to drive two of the primary switching transistors, and an auxiliary switch control circuit configured to provide a reset signal to the primary switch control circuit for governing a command from the primary switch control circuit to the primary switching transistors. The auxiliary switch control circuit outputs a driving signal for the auxiliary switching transistor to control the auxiliary switching transistor. The primary switch control circuit includes a section selecting circuit, an integrating circuit, a merging
(Continued)

circuit and a comparing circuit. Therefore, the disclosure can reduce cost with the simple control.

12 Claims, 3 Drawing Sheets

(52) U.S. Cl.
CPC ......... *H02M 1/4233* (2013.01); *H02M 7/219* (2013.01); *H02M 2001/0058* (2013.01)

(58) Field of Classification Search
CPC ...... H02M 7/04; H02M 7/155; H02M 7/1555; H02M 7/21; H02M 7/217; H02M 7/219; H02M 5/40; H02M 5/45; H02M 5/4505; H02M 5/458
See application file for complete search history.

(56) References Cited

U.S. PATENT DOCUMENTS

| | | | |
|---|---|---|---|
| 2009/0273330 A1* | 11/2009 | Sisson | G05F 1/70 323/288 |
| 2013/0194838 A1* | 8/2013 | Jang | H02M 1/4216 363/37 |
| 2016/0049892 A1* | 2/2016 | Moghadas | H02P 23/0081 166/66.4 |
| 2017/0187290 A1* | 6/2017 | Li | H02M 3/1582 |

* cited by examiner

SOFT-SWITCHING CONTROL CIRCUIT OF BOOST-TYPE PFC CONVERTER

TECHNICAL FIELD

The disclosure relates to a technical field of converters, and more particularly to a soft-switching control circuit of a boost-type power factor correction (PFC) converter.

DESCRIPTION OF RELATED ART

A three-phase six-switch boost-type PFC converter works in a continuous current mode, therefore the input inductor current as well as the switch current stress are relatively small, the voltage stress of switch devices is small, and the efficiency of the converter is relatively high; the three-phase six-switch boost-type PFC converter has various advantages, which include the superior input current waveform and the stable output voltage. The primary topology thereof is as shown in FIG. 1, which includes three bridge legs. Each bridge leg includes an inductor, two switching transistors and a diode connected in parallel with the switching transistors; the output terminal is disposed with a capacitor and a resistor. But the hard-switching of the switching transistors and the reverse recovery current of the diode in FIG. 1 bring much trouble, and restrict the enhancement of efficiency of the converter switch and generate considerable electromagnetic interferences.

In the related art, in order to solve the problem above, some auxiliary circuits are added into the circuit in FIG. 1 to achieve the soft-switching operation of the switching transistors, and simultaneously inhibit the reverse recovery problem of the diode. FIG. 2 shows a compound active-clamping zero voltage switch (ZVS) based three-phase boost-type PFC converter, which has certain superiority due to the simple structure. As shown in FIG. 2, an auxiliary switching transistor, and a capacitor, a diode and an inductor electrically connected therewith are added in the circuit.

Nowadays, the converter in FIG. 2 is fulfilled by an improved space vector modulation method. The improved space vector modulation method divides a period of an input three-phase voltage into 12 sectors, which re-divides six sectors by the conventional space vector modulation method into two to form 12 sectors. Then two basic vectors and a zero vector are given according to the space vector modulation method. The modulation is done by controlling the time of three vectors. Therefore, the three-phase input current vector rotates along a round orbit.

The control method in the related art contains following shortcomings.

1. The algorithm to control the three-phase boost-type PFC converter by the improved support vector machine (SVM) space vector modulation method is complicated.
2. The fulfillment by a smart chip such as the digital signal processing (DSP) or the microcontroller unit (MCU) requires cooperation of various additional resources and programs, and the development period is long.
3. The cost of controllers is high.
4. Relative theories are abstract and obscure.
5. The technology is hard to be reproduced.

SUMMARY

The disclosure primarily provides a control circuit of a boost-type PFC converter, which can reduce costs with simple control, and the technology is extremely easy to be reproduced.

In order to solve the technical problem above, one solution of the embodiment is providing a control circuit of a boost-type PFC converter. The converter is a three-phase six-switch converter, which includes six primary switching transistors and an auxiliary switching transistor. The control circuit includes a primary switch control circuit configured for outputting driving signals for the primary switching transistors by a one-cycle control algorithm to drive two of the primary switching transistors, and an auxiliary switch control circuit configured for supplying a reset signal to the primary switch control circuit for governing a command from the primary switch control circuit to the primary switching transistors. Furthermore, the auxiliary switch control circuit further is configured for outputting a driving signal for the auxiliary switching transistor, so as to control the auxiliary switching transistor.

In one of embodiments, the auxiliary switch control circuit includes a first controller and a second controller. The first controller includes a first branch circuit and a second branch circuit; the first branch circuit is configured for receiving a clock signal, and outputting the driving signal for the auxiliary switching transistor according to the clock signal; the second branch circuit is configured for receiving the clock signal, and outputting a reset initial signal according to the clock signal; the second controller is configured for receiving the reset initial signal, and outputting a reset signal according to the reset initial signal.

In one of embodiments, the clock signal and the driving signal for auxiliary switching transistor are mutually phase-reversed signals.

In one of embodiments, the first branch circuit includes a NOT gate circuit. An input terminal of the NOT gate circuit is configured for receiving the clock signal; an output terminal of the NOT gate circuit is configured for reversing a phase of the clock signal to obtain the driving signal for auxiliary switching transistor.

In one of embodiments, the second branch circuit includes a resistor, a capacitor and an AND gate circuit. An end of the resistor is configured for receiving the clock signal, another end of the resistor is electrically connected with an end of the capacitor and an input terminal of the AND gate circuit; another end of the capacitor is grounded; while another input terminal of the AND gate circuit receives the clock signal and an output terminal of the AND gate circuit outputs the reset initial signal.

In one of embodiments, the delay time between the driving signals for the primary switching transistors and the reset signal is set according to the resonance time of a bridge leg voltage of the boost-type power factor correction converter.

In one of embodiments, the second controller further is configured for, after the first controller outputs the driving signal to drive the auxiliary switching transistor to be turned off, outputting the reset signal to drive the primary switching transistors of a bridge leg circuit when a bridge leg voltage of the bridge leg circuit resonates to be zero.

In one of embodiments, a frequency of the clock signal is equal to a frequency of the reset signal; compared with the clock signal, a rising edge of the reset signal has a backward time shift, and a falling edge of the reset signal has a forward time shift; and thereby a duty ratio is changed.

In one of embodiments, a duty ratio of the clock signal is larger than 10%, and a duty ratio of the reset signal is less than 5%.

In embodiments, the second controller includes a first AND gate circuit and a second AND gate circuit, a NOT gate circuit, a resistor and a capacitor. An of the resistor receives the reset initial signal, and another end of the resistor is electrically connected with an end of the capacitor and an input terminal of the first AND gate circuit; another end of capacitor is grounded; another end of the first AND gate circuit is configured for receiving the reset initial signal, and an output terminal of the first AND gate circuit is electrically connected with an input terminal of the NOT gate circuit; an input terminal of the second AND gate circuit is configured for receiving the reset initial signal, another input terminal of the second AND gate circuit is electrically connected with an output terminal of the NOT gate circuit; an output terminal of the second AND gate circuit is configured for outputting the reset signal.

On the other hand, the disclosure further provides a control circuit of a boost-type PFC converter. The boost-type PFC converter is a three-phase six-switch boost-type PFC converter, which includes six primary switching transistors and an auxiliary switching transistor; the control circuit includes a section selecting circuit dividing an input voltage signal into six sections with a 60° phase interval and configured for selecting two current absolute value signals in need, an integrating circuit configured for obtaining a current comparison signal, two merging circuits configured for intersecting and merging the two current absolute value signals to obtain two current merging signals, and two comparing circuits respectively configured for comparing the two current merging signals with the current comparison signal to obtain two pulse width modulation signals.

The section selecting circuit is configured for taking two pulse width modulation signals (generated based on the obtained two pulse width modulation signals) as driving signals for the primary switching transistors, so as to drive two of the primary switching transistors of the boost-type power factor correction converter.

Distinguished from the related art, the disclosure provides a soft-switching control circuit of a boost-type PFC converter. The boost-type PFC converter is a three-phase six-switch boost-type PFC converter, which includes six primary switching transistors and an auxiliary switching transistor. The control circuit includes a primary switch control circuit configured to output driving signals for the primary switching transistors by a one-cycle control algorithm to drive two of the primary switching transistors, and an auxiliary switch control circuit, which is configured to provide a reset signal to the primary switch control circuit for governing a command from the primary switch control circuit to the primary switching transistors. Furthermore, the auxiliary switch control circuit further outputs a driving signal for the auxiliary switching transistor, so as to control the auxiliary switching transistor.

Additionally, the disclosure provides a control circuit of a boost-type PFC converter. The converter is a three-phase six-switch converter, which includes six primary switching transistors and an auxiliary switching transistor. The control circuit includes a section selecting circuit configured to select two current absolute value signals in need, an integrating circuit configured to obtain a current comparison signal, two merging circuits configured to intersect and merge the two current absolute value signals to obtain two current merging signals, and two comparing circuits configured to compare the current comparison signal with each of the two current merging signals to obtain two pulse width modulation signals. The section selecting circuit chooses the two pulse width modulation signals as driving signals for the primary switching transistors, so as to drive two of the primary switching transistors of the boost-type power factor correction converter. Therefore, the disclosure can reduce costs with simple control, and the technology is extremely easy to be reproduced.

BRIEF DESCRIPTION OF THE DRAWINGS

In order to clearly illustrate technical solutions in embodiments of the disclosure or the related art, the drawings required in description of the embodiments or the related art will be briefly introduced. Apparently, the described drawings below are merely some embodiments of the disclosure, and a person skilled in the art can obtain other drawings according to these drawings without any inventive work.

DETAILED DESCRIPTION OF PREFERRED EMBODIMENTS

In order to better clarify objectives, technical solutions and advantages of embodiments of the disclosure, the technical solutions in the embodiments of the disclosure will be described clearly with reference to the accompanying drawings in the embodiments of the disclosure as follows. Apparently, the described embodiments are merely some embodiments of the disclosure rather than all of the embodiments. Based on the embodiments in the disclosure, all the other embodiments obtained by a person skilled in the art without any creativity should belong to the protective scope of the disclosure.

Figure 1:
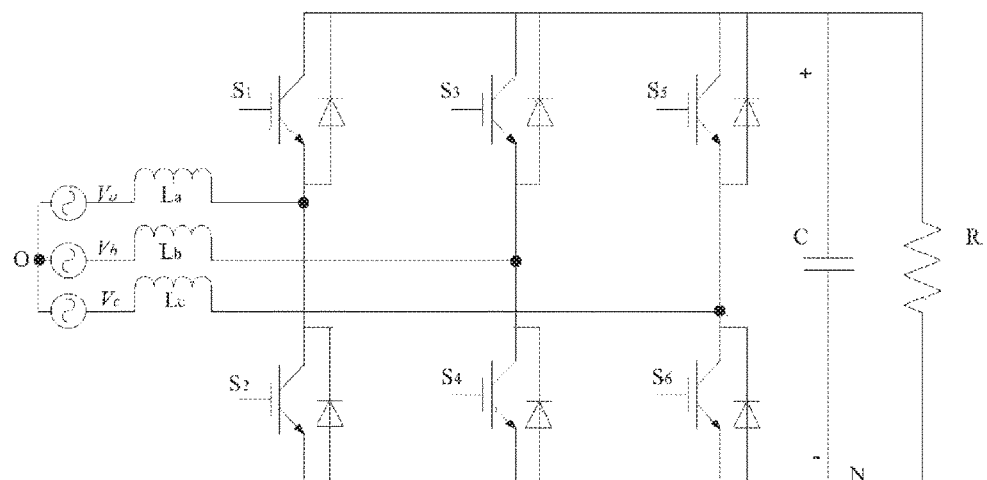
FIG. 1 is a structural schematic view of a converter associated with a related art.
Figure 2:
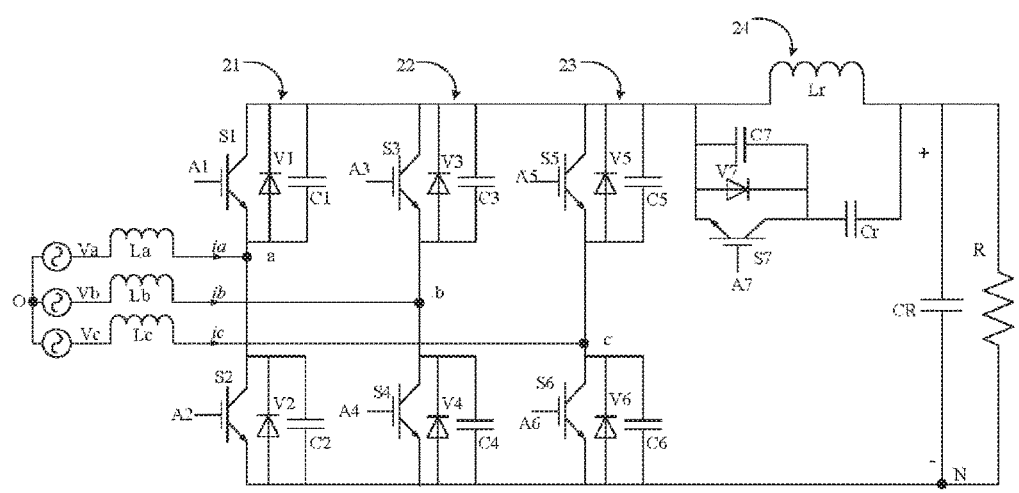
FIG. 2 is a structural schematic view of a three-phase six-switch boost-type PFC converter with a soft-switching function.
Figure 3:
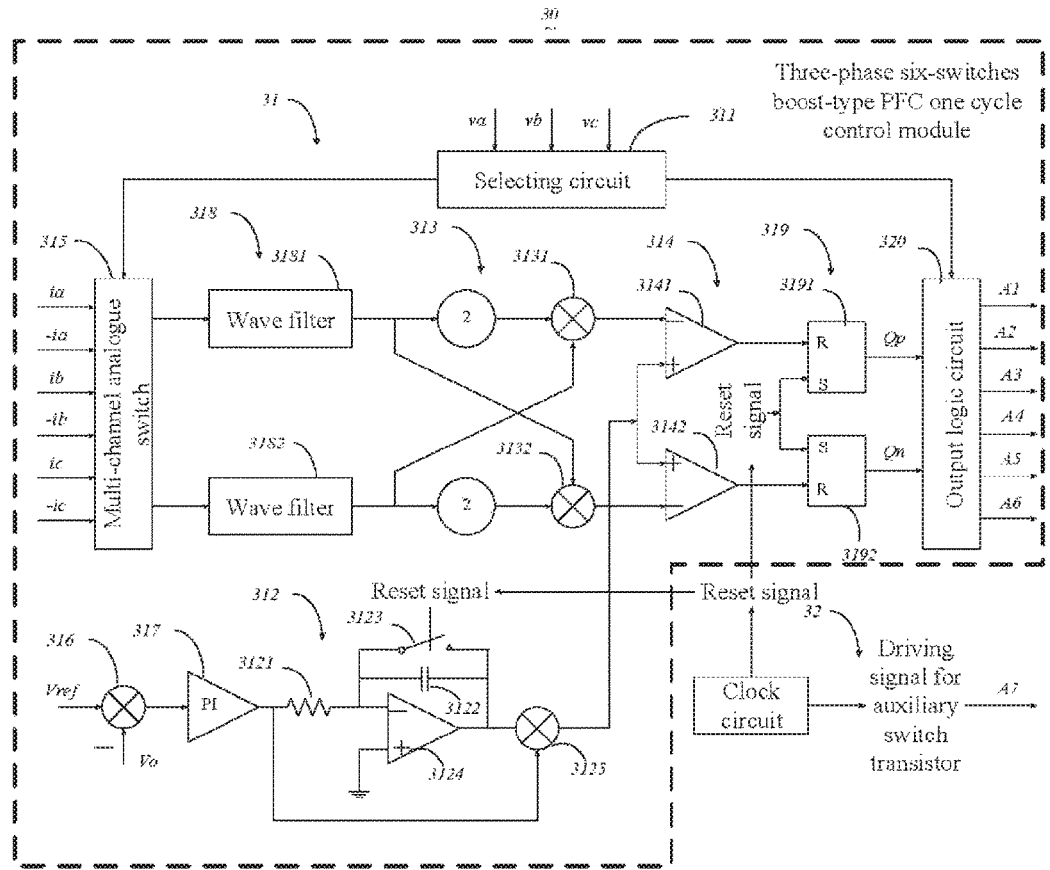
FIG. 3 is a structural schematic view of a control circuit of a converter provided by an embodiment of the disclosure.

Referring to FIG. 2 and FIG. 3, FIG. 2 is a structural schematic view of a three-phase six-switch boost-type PFC converter, and FIG. 3 is a structural schematic view of the control circuit of a boost-type PFC converter provided by an embodiment of the disclosure. First as shown in FIG. 2, the three-phase six-switch converter includes three parallel connected bridge leg circuits 21-23 and an auxiliary circuit 24. The auxiliary circuit 24 is connected between the bridge leg circuits and an output terminal. Each of the bridge leg circuits includes an inductor, two switching transistors, two diodes and two capacitors. For instance, the bridge leg circuit 21 includes an inductor La, switching transistors S1 and S2, diodes V1 and V2 and capacitors C1 and C2. One end of the inductor La receives a voltage signal Va, and the other end is electrically connected with an emitter of the switching transistor S1 and a collector of the switching transistor S2. Base electrodes of the switching transistors S1 and S2 respectively receive driving signals A1 and A2; the collector of the switching transistor S1 is electrically connected with the bridge leg circuits 22, 23 and the auxiliary circuit 24. The emitter of the switching transistor S2 is electrically connected with the bridge leg circuits 22 and 23. The diodes V1 and V2 are connected in parallel with the switching transistors S1 and S2, respectively; the capacitors C1 and C2 connected in parallel with the switching transistors S1 and S2 respectively.

Similarly, the connection manner of other bridge leg circuits 22 and 23 is same as that of the bridge leg circuit 21, which will not be repeated herein.

The auxiliary circuit 24 is disposed between the bridge leg circuit and the output terminal. The auxiliary circuit 24 includes an inductor Lr, capacitors Cr and C7, a diode V7 and a switching transistor S7. One end of the inductor Lr is electrically connected with the bridge leg circuit, and the other end is electrically connected with the output terminal. The emitter and the collector of the switching transistor S7 are connected with the bridge leg circuit and one end of the capacitor Cr, respectively. The base electrodes receive a driving signal A7. The other end of the capacitor Cr is electrically connected with the output terminal. The capacitor C7 and the diode V7 are connected in parallel with the switching transistor S7.

The switching transistors S1-S6 are primary switching transistors, and the switching transistor S7 is an auxiliary switch transistor.

As shown in FIG. 3, a control circuit 30 includes a primary switch control circuit 31 and an auxiliary switch control circuit 32.

The primary switch control circuit 31 is configured to output driving signals for the primary switching transistors by a one-cycle control algorithm for driving two primary switching transistors therein.

The auxiliary switch control circuit 32 is configured to provide a reset signal to the primary switch control circuit 31, so as to govern the command from the primary switch control circuit 31 to the primary switching transistors. Furthermore, the auxiliary switch control circuit 32 outputs the driving signal A7 of the auxiliary switching transistor to control the auxiliary switching transistor S7. The auxiliary switch control circuit 32 in the embodiment is a clock circuit.

In the embodiment, the primary switch control circuit 31 includes a section selecting circuit 311, an integrating circuit 312, a merging circuit 313 and a comparing circuit 314.

The section selecting circuit 311 is configured to choosing two current absolute value signals. Specifically, the control circuit 30 further includes a sensor (not shown), a rectifying circuit (not shown) and a multi-channel analogue switch 315. The embodiment first obtains the current of the converter by the sensor, which specifically is obtaining three-phase currents ia, ib and ic of the converter. The rectifying circuit rectifies the three-phase currents of the converter to obtain the current absolute value signals. When the current is positive, the current waveform is constant; when the current is negative, the polarity of the output current signal is reverse, such as the input of positive and negative phase currents ia, −ia, ib, −ib, ic and −ic in FIG. 3. The sensor preferably is a Hall sensor.

The multi-channel analogue switch 315 receives current absolute value signals ia, −ia, ib, −ib, ic and −ic, and receives a selecting signal of the section selecting circuit 311 to choose two required current absolute value signals.

The integrating circuit 312 is configured to obtain a current comparison signal.

Specifically, the control circuit 30 further includes a voltage insulating collector (not shown), a comparator 316 and a regulator 317. The voltage insulating collector is configured to obtain a direct-current voltage V0. The voltage insulating collector preferably is an isolated voltage insulating collector. The comparator 316 is configured to compare the direct-current voltage V0 with a reference voltage Vref to obtain an error signal. The regulator 317 is configured to generate a control signal by regulation according to the error signal. The integrating circuit 312 obtains the current comparison signal. The current comparison signal is a sawtooth wave signal.

The integrating circuit 312 is a re-settable integrating circuit. Specifically, the integrating circuit 312 includes an integrating resistor 3121, an integrating capacitor 3122, a reset switch 3123, an integrating comparator 3124 and an integrator 3125. One end of the integrating resistor 3121 is electrically connected with an output terminal of the regulator 317 and an input terminal of the integrator 3125; the other end of the integrating resistor 3121 is electrically connected with the integrating capacitor 3122, an end of the reset switch 3123 an input terminal of the comparator 3124. The other input terminal of the comparator 3124 is grounded; an output terminal of the comparator 3124 is electrically connected with the other input terminal of the integrator 3125, the other ends of the reset switch 3123 and the integrating capacitor 3122. A control terminal of the reset switch 3123 receives the reset signal.

The merging circuit 313 includes two circuits 3131 and 3132, which are configured to intersect and merge two current absolute value signals to obtain two current merging signals.

The comparing circuit 314 includes two circuits 3141 and 3142, which are configured to compare the comparing signal with each of two current merging signals to obtain two pulse width modulation signals.

The section selecting circuit 311 chooses two pulse width modulation signals as driving signals for the primary switching transistors to drive two primary switching transistors in the converter.

Moreover, the control circuit 30 further includes a wave filter 318 with two circuits 3181 and 3182, which respectively are configured to filtering waves of two current absolute signals. The wave filter 318 is a low-pass filter.

Moreover, the control circuit 10 further includes a trigger 319 and an output logic circuit 320. The trigger 319 includes two circuits 3191 and 3192, which respectively are configured to output the pulse width modulation signals according to the reset signal. The output logic circuit 320 is configured to receive the pulse width modulation signals and the selecting signal of the section selecting circuit 311, and output any two of driving signals A1-A6 for driving two primary switching transistors in the converter. The rest four primary switching transistors remain to be turned off. The driving signals A1-A6 respectively drive the switching transistors S1-S6.

The aforementioned introduction is the structure of the primary switch control circuit 31, and the structure of the auxiliary switch control circuit 32 will be introduced as follows, we refer to FIG. 4.

Figure 4:
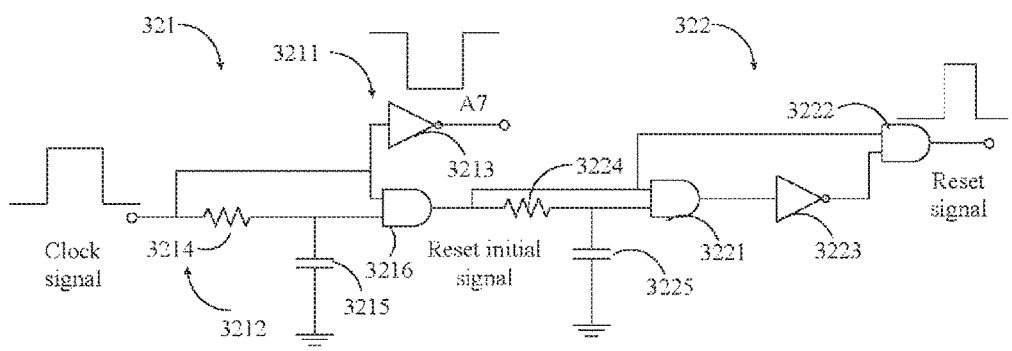
FIG. 4 is a structural schematic of an auxiliary switching transistor control circuit shown in FIG. 3.

As shown in FIG. 4, the auxiliary switch control circuit 32 includes a first controller 321 and a second controller 322. The first controller 321 includes a first branch circuit 3211 and a second branch circuit 3212. The first branch circuit 3211 receives the clock signal, and outputs the driving signal A7 of the auxiliary switching transistor according to the clock signal; the second branch circuit 3212 receives the clock signal, and outputs a reset initial signal according to the clock signal. The clock signal and driving signal A7 are mutually phase-reversed signals.

The first branch circuit 3211 includes a NOT gate circuit 3213. An input terminal, of the NOT gate circuit 3213 receives the clock signal, and an output terminal thereof reverses the phase of the clock signal to obtain the driving signal A7.

The second branch circuit 3212 includes a resistor 3214, a capacitor 3215 and an AND gate circuit 3216. An end of the resistor 3214 receives the clock signal, the other end is electrically connected with an end of the capacitor 3215 and an input terminal of the AND gate circuit 3216. The other end of the capacitor 3215 is grounded. The other input terminal of the AND gate circuit 3216 receives the clock signal; an output terminal of the AND gate circuit 3216 outputs the reset initial signal.

The second controller 322 receives the reset initial signal, and outputs the reset signal according to the reset initial signal. Specifically, the second controller 322 includes two AND gate circuits 3221 and 3222, a NOT gate circuit 3223, a resistor 3224 and a capacitor 3225. One end of the resistor 3224 receives the reset initial signal; the other end of the resistor 3224 is electrically connected with one end of the capacitor 3225 and one input terminal of the AND gate circuit 3221. The other end of the capacitor 3225 is grounded. The other input terminal of the AND gate circuit 3221 receives the reset initial signal, and the output terminal is electrically connected with the input terminal of the NOT gate circuit 3223. An input terminal of the AND gate circuit 3222 receives the reset initial signal; the other input terminal is electrically connected with the output terminal of the NOT gate circuit 3223. The output terminal of the AND gate circuit 3222 outputs the reset signal.

In the embodiment, the time of the driving signal and the reset signal is determined according to the resonance time of the bridge leg voltage of the converter. The second controller 322 outputs the reset signal to drive the primary switching transistors of the bridge leg after outputting the driving signal to drive the auxiliary switching transistor S7 to be turned off, namely the bridge leg voltage resonates to be zero.

A frequency of the clock signal and a frequency of the reset signal are the same. However, compared with the clock signal, a rising edge of the reset signal has a backward time shift, and a falling edge thereof has a forward time shift, which change a duty ratio. The duty ratio of the clock signal is larger than 10%, and the duty ratio of the reset signal is less than 5%.

Figure 5:
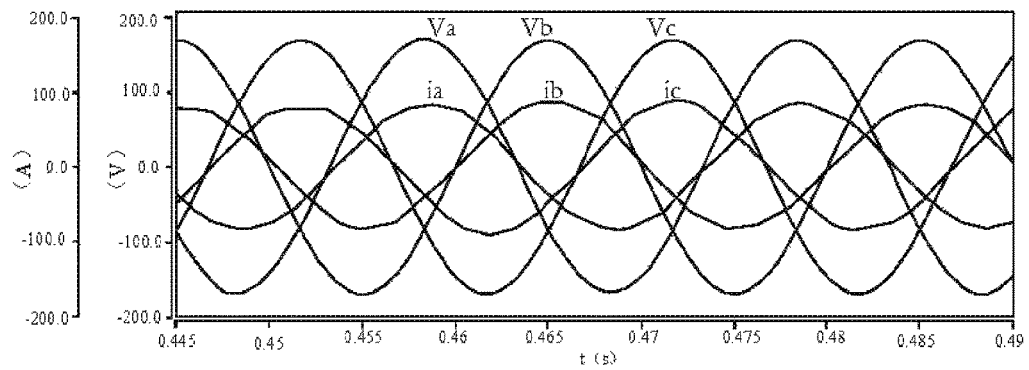
FIG. 5 is a waveform of input phase voltages and input phase currents.

The soft-switching function of the boost-type PFC converter can be achieved by the aforementioned control circuit. In order to verify the correctness of the disclosure, we refer to FIG. 2. Va, Vb and Vc are three phased input phase voltage amplitudes, which are set to be 170V input, the output voltage is set to be 500V, the clock frequency is 10 KHz, the boost inductance is set to be 0.5 mH, the capacitance of C1~C7 is set to be 10 nF, a resonance inductance Lr is set to be 50 uH, a clamping capacitance Cr is set to be 480 uF, a load R is set to be 10Ω (25 KW output), and a support capacitor C is set to be 1000 uF. Waveforms of the input phase voltages Va, Vb, Vc and the input phase currents ia, ib, is are as shown in FIG. 5. An input power factor of the converter approaches 1. The phase current waveform is sinusoidal, which basically follows the phase voltage waveform.

Figure 6:
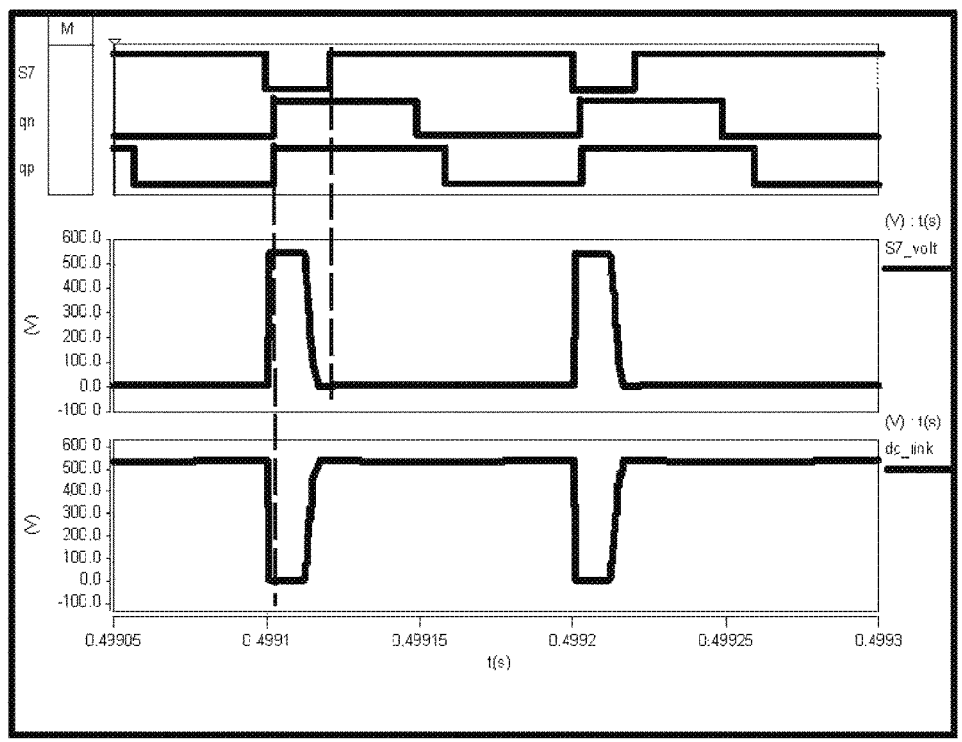
FIG. 6 is a waveform of ZVS of a primary switching transistor and an auxiliary switching transistor.

The ZVS of the primary switching transistor and the auxiliary switching transistor of the embodiment is achieved as shown in FIG. 6. Long dashed lines shown in FIG. 6 indicate a period in which the primary switching transistors are turned on, which are turned on when the dc-link is turned to zero, to achieve turning on while zero voltage. Short dashed lines indicate a period in which the auxiliary switching transistor is turned on, which is turned on when voltages on two ends of the auxiliary switching transistor S7 are reduced to zero, further achieving the purpose of turning on while zero voltage. As each of the primary switching transistors and the auxiliary switching transistor is parallel connected with a capacitor, the switching transistors can be regarded to be turned off at zero voltage (the capacitor voltage cannot be abruptly changed, which requires the charging time), therefore, the system fulfills the soft-switching work of all switching transistors.

In conclusion, the disclosure can achieve the soft-switching function of the converter by a simple circuit, which is a price chopper with easy control, and the technology is extremely fit for spreading.

The embodiments above are solely embodiments of the disclosure rather than limiting the scope of the disclosure. Any equivalent structure, process substitute and one-cycle control based equivalent auxiliary switch driving method derived from contents in the specification and drawings of the disclosure, directly or indirectly utilized in other related technical fields, should be included in the protected scope of the disclosure.

A final declaration is the aforementioned embodiments purely are for illustrating technical solutions of the disclosure rather than any limitation applied thereto; even though the disclosure has been introduced in detail with reference to the embodiments above, a person skilled in the art can understand the technical solutions recorded in the embodiments above can be modified; some or all of the features therein can be replaced; but the modification or replacement will not lead to the essence of the corresponding technical solution to be excluded from the spirit and scope of the technical solutions of the embodiments of the disclosure.

What is claimed is:

1. A soft-switching control circuit of a boost-type power factor correction converter, wherein the boost-type power factor correction converter is a three-phase six-switch boost-type power factor correction converter comprising six primary switching transistors and an auxiliary switching transistor; wherein the soft-switching control circuit comprises:
   a primary switch control circuit, configured for sending driving signals for the primary switching transistors by a one-cycle control algorithm, to drive two of the primary switching transistors;
   a clock circuit, configured for supplying a reset signal to the primary switch control circuit to govern a control from the primary switch control circuit to the primary switching transistors; wherein the clock circuit further is configured for sending a driving signal for the auxiliary switching transistor, so as to control the auxiliary switching transistor;
   wherein the clock circuit comprises a first controller and a second controller;
   wherein the first controller comprises a first branch circuit and a second branch circuit; the first branch circuit is configured for receiving a clock signal, and outputting the driving signal for the auxiliary switching transistor according to the clock signal; the second branch circuit is configured for receiving the clock signal, and outputting a reset initial signal according to the clock signal;
   wherein the second controller is configured for receiving the reset initial signal, and outputting a reset signal according to the reset initial signal.

2. The soft-switching control circuit of a boost-type power factor correction converter according to claim 1, wherein the clock signal and the driving signal are mutually phase-reversed signals.

3. The soft-switching control circuit of a boost-type power factor correction converter according to claim 2, wherein the first branch circuit comprises a NOT gate circuit; an input terminal of the NOT gate circuit is configured for receiving the clock signal, an output terminal of the NOT gate circuit is configured for reversing a phase of the clock signal to obtain the driving signal.

4. The soft-switching control circuit of a boost-type power factor correction converter according to claim 2, wherein the second branch circuit comprises a resistor, a capacitor and an AND gate circuit;
wherein an end of the resistor is configured for receiving the clock signal, another end of the resistor is electrically connected with an end of the capacitor and an input terminal of the AND gate circuit;
wherein another end of the capacitor is grounded;
wherein another input terminal of the AND gate circuit is configured for receiving the clock signal; an output terminal of the AND gate circuit is configured for outputting the reset initial signal.

5. The soft-switching control circuit of a boost-type power factor correction converter according to claim 1, wherein the first branch circuit comprises a NOT gate circuit; an input terminal of the NOT gate circuit is configured for receiving the clock signal, an output terminal of the NOT gate circuit is configured for reversing a phase of the clock signal to obtain the driving signal.

6. The soft-switching control circuit of a boost-type power factor correction converter according to claim 1, wherein the second branch circuit comprises a resistor, a capacitor and an AND gate circuit;
wherein an end of the resistor is configured for receiving the clock signal, another end of the resistor is electrically connected with an end of the capacitor and an input terminal of the AND gate circuit;
wherein another end of the capacitor is grounded;
wherein another input terminal of the AND gate circuit is configured for receiving the clock signal; an output terminal of the AND gate circuit is configured for sending the reset initial signal.

7. The soft-switching control circuit of a boost-type power factor correction converter according to claim 1, wherein a delay time between the driving signals for the primary switching transistors and the reset signal is set according to a resonance time of a bridge leg voltage of the boost-type power factor correction converter.

8. The soft-switching control circuit of a boost-type power factor correction converter according to claim 1, wherein the second controller further is configured for, after the first controller outputs the driving signal to drive the auxiliary switching transistor to be turned off, sending the reset signal to drive the primary switching transistors of a bridge leg circuit when a bridge leg voltage of the bridge leg circuit resonates to be zero.

9. The soft-switching control circuit of a boost-type power factor correction converter according to claim 1, wherein a frequency of the clock signal is equal to a frequency of the reset signal; compared with the clock signal, a rising edge of the reset signal has a backward time shift, a falling edge of the reset signal has a forward time shift, and thereby a duty ratio is changed.

10. The soft-switching control circuit of a boost-type power factor correction converter according to claim 1, wherein a duty ratio of the clock signal is larger than 10%, and a duty ratio of the reset signal is less than 5%.

11. The soft-switching control circuit of a boost-type power factor correction converter according to claim 1, wherein the second controller comprises a first AND gate circuit and a second AND gate circuit, a NOT gate circuit, a resistor and a capacitor;
wherein an end of the resistor is configured for receiving the reset initial signal, another end of the resistor is electrically connected with an end of the capacitor and an input terminal of the first AND gate circuit;
wherein another end of the capacitor is grounded;
wherein another end of the first AND gate circuit is configured for receiving the reset initial signal, an output terminal of the first AND gate circuit is electrically connected with an input terminal of the NOT gate circuit;
wherein an input terminal of the second AND gate circuit is configured for receiving the reset initial signal, another input terminal of the second AND gate circuit is electrically connected with an output terminal of the NOT gate circuit; an output terminal of the second AND gate circuit is configured for outputting the reset signal.

12. A control circuit of a boost-type power factor correction converter, wherein the boost-type power factor correction converter is a three-phase six-switch boost-type power factor correction converter comprising six primary switching transistors and an auxiliary switching transistor; the control circuit is fulfilled by a one-cycle control method; the control circuit comprises:
a section selecting circuit, configured for dividing an input voltage signal into six sections with a 60° phase as an interval and selecting two current absolute value signals in need;
an integrating circuit, configured for obtaining a current comparison signal;
two merging circuits, configured for intersecting and merging the two current absolute value signals to obtain two current merging signals; and
two comparing circuits, respectively configured for comparing the two current merging signals with the current comparison signal to obtain two pulse width modulation signals;
wherein the section selecting circuit is configured for taking two pulse width modulation signals as driving signals for the primary switching transistors, so as to drive two of the primary switching transistors of the boost-type power factor correction converter.

* * * * *